Figure 1:
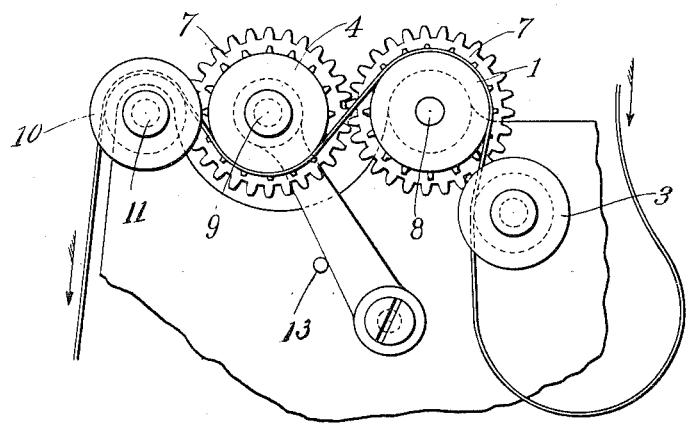

N. POWER.
FEEDING MECHANISM FOR MOTION PICTURE MACHINES.
APPLICATION FILED APR. 15, 1912.

1,088,365.

Patented Feb. 24, 1914.

2 SHEETS—SHEET 1.

Witnesses:
Raphael Ketter
C. D. Morrill

Nicholas Power  Inventor
By his Attorney

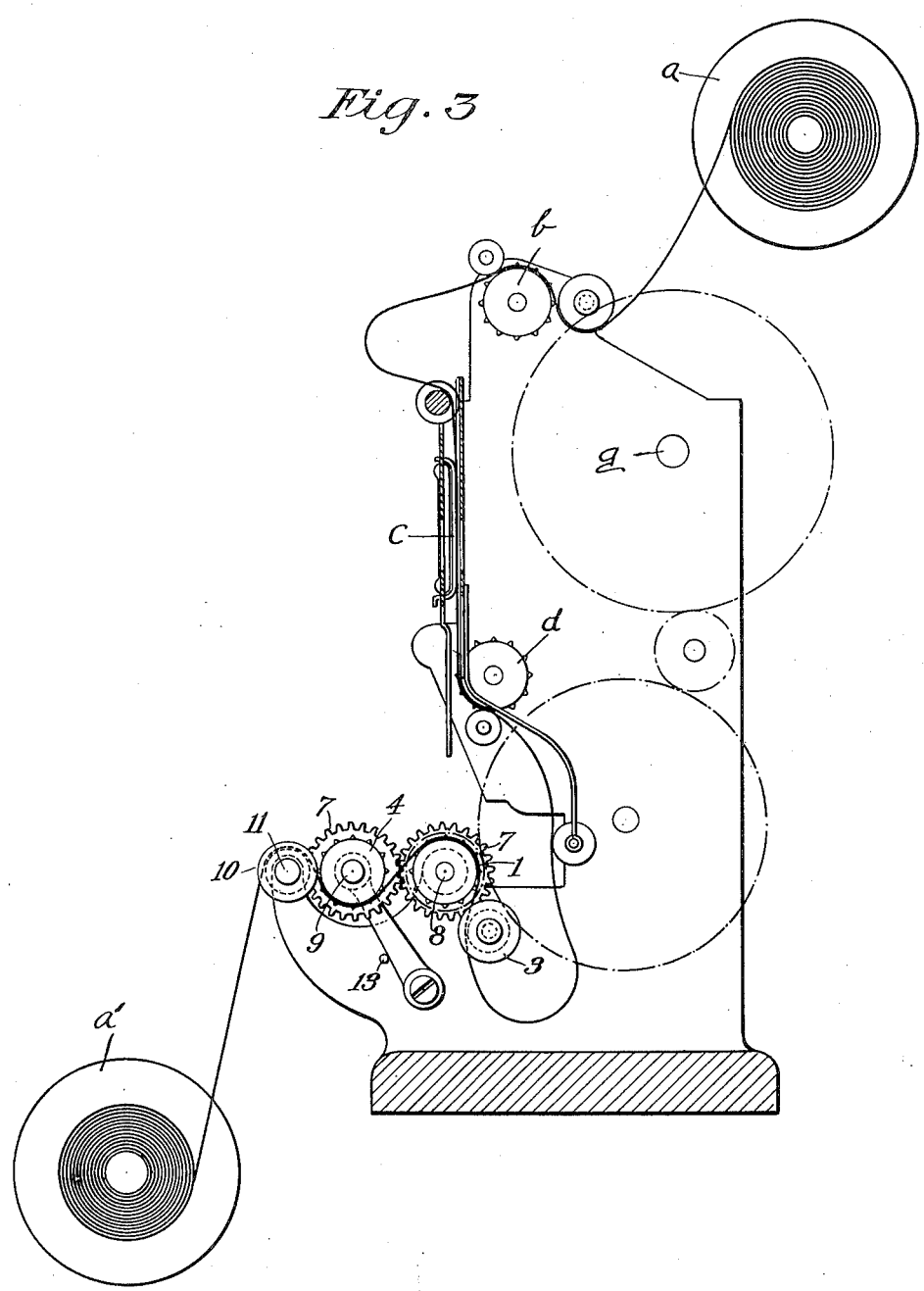

UNITED STATES PATENT OFFICE.

NICHOLAS POWER, OF BROOKLYN, NEW YORK.

FEEDING MECHANISM FOR MOTION-PICTURE MACHINES.

1,088,365.  Specification of Letters Patent.  Patented Feb. 24, 1914.

Application filed April 15, 1912. Serial No. 690,898.

*To all whom it may concern:*

Be it known that I, NICHOLAS POWER, a citizen of the United States, residing at Brooklyn, New York, with post-office address at No. 388 Jefferson avenue, have invented certain new and useful Improvements in Feeding Mechanism for Motion-Picture Machines, of which the following is a specification.

In motion picture machines as at present almost universally constructed the reel of film to be exhibited is placed in a magazine at the top of the machine and is then fed through the projecting apparatus by a feed mechanism comprising a continuously driven sprocket below the magazine and an intermittently driven sprocket below the projection aperture. The teeth of the feed sprockets engage perforations in the margins of the film and the film is threaded in the machine so that the top sprocket maintains a certain amount of slack in the film between the sprockets to prevent undue tension on the film during the operation of the intermittent sprocket. Beneath the intermittent sprocket a second continuously driven sprocket is arranged for controlling the feed of the film to the receiving reel beneath the machine. This reel is driven through a slip gear which maintains a constant tension on the film to secure proper winding, this tension normally coming on the lower continuous sprocket, the film being originally so threaded as to provide a loop between the intermittent sprocket and the lower sprocket. If, however, for any reason the film becomes disengaged from the lower sprocket, the reel will take up the loop and this sudden pull coming on the film temporarily held stationary by the intermittent sprocket, frequently damages the film before the operator can stop the machine, as well as causing annoying delays in the exhibition while the operator re-sets the film with the proper loop. The chief causes of the slipping of the film from the lower sprocket are the destruction or mutilation of the driving perforations in the margins of the film and the imperfect piecing of the film so that the perforations do not register, thereby covering up the holes for the length of the joint or reducing their size so that they will not fit over the sprocket teeth.

The object of my present invention is to provide a lower sprocket construction which will enable a film having an imperfect joint or mutilated margins of average extent to be fed without disengagement from the lower sprocket mechanism and without permitting the tension of the reel taking up the loop in advance of the intermittent sprocket.

Figure 2:
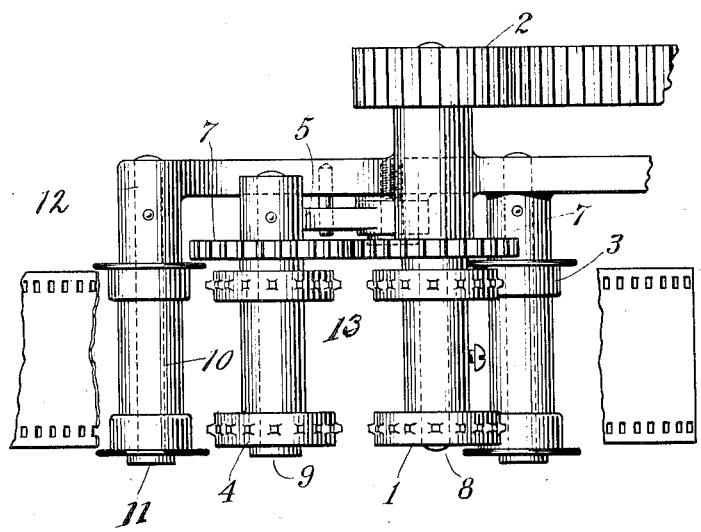

In the accompanying drawings, forming part of this specification, I have illustrated a preferred embodiment of my invention and in the said drawings, Figure 1 is a view in side elevation of my improved feed mechanism. Fig. 2 is a plan view of the same, and Fig. 3 is a diagrammatic view of a typical motion picture machine equipped with the mechanism shown in Figs. 1 and 2.

Referring now to the drawing by the reference characters which are marked thereon, each character in corresponding views representing corresponding parts, *a* indicates the upper reel from which the film is fed by the upper continuously driven sprocket *b*. Below this sprocket is arranged the guide *c* adjacent the projection aperture through which the film is fed by the intermittently operated sprocket *d*. The sprockets *b* and *d* are driven in the usual manner by intermediate gearing, not shown, from the driving shaft *g*.

1 designates the main lower sprocket of the machine to which rotation is imparted from the driving shaft *g* to the spindle 8 of the sprocket by gear wheels 2. Between the sprockets *d* and 1 the film forms a loop as shown in Figs. 1 and 3.

3 designates a tension roller which is placed a little lower and slightly in front of the sprocket 1 in order to insure proper contact of the film with the teeth of the sprocket. From the sprocket 1 the film passes downward and under a shiftable sprocket 4, which is arranged behind and in direct line with the sprocket 1, and mounted on a spindle 9 carried in the end of a swinging arm 5. The arm 5 is arranged so that when the machine is equipped with an unworn film the gears 7—7, which are just alike and are attached to the sprockets 1 and 4, are meshed loosely, as shown in Fig. 2, with the film resting evenly over all the teeth. At the back of the sprocket 4 is a second film tension roller 10 which is mounted with its axis in the same horizontal plane as the axes of the two sprockets, thus affording a support for the film after it passes out of contact with the sprocket 4. The roller 10 is mounted upon a spindle 11, which is carried in an elbow 12, which extends rearward from the bearing which carries the sprocket spindle 8. From the roller 10 the film passes to the receiving reel a' which is driven in the usual manner by mechanism, not shown, so as to maintain a fixed tension on the film beyond the sprockets. To limit the motion of the sprocket 4 toward the tension roller 10, a stop pin 13 is provided, as best shown in Fig. 2, this stop pin being placed so as to maintain the gears 7—7 always in mesh.

The operation of the additional sprocket 4, in the improved structure above described will be readily understood from the foregoing description and the accompanying drawings. In the first place unless the holes in the film should be destroyed through a distance equal to the length of the path of the film from the first engaged tooth of sprocket 1 to the last engaged tooth of sprocket 4, an unusual occurrence in films still fit for exhibition, the normal feeding of the film will not be disturbed. In film in which the perforations are intact but which has undergone more or less wear through service in various moving picture machines, the action of the extra sprocket 4 upon the film is simply to increase the number of sprocket holes in engagement with the sprockets, while at the same time providing for inequalities in the amount of shrinkage which has taken place in the film. Were the sprockets 1 and 4 relatively immovable or all the teeth upon a single large sprocket, any shrinkage in the film or other irregularity would cause the film to bind and tear. The movable sprocket also operates advantageously in the passage of a joint or splice in the film. If the sprocket holes are imperfectly registered the joined portion which is usually about the length of the semi-circumference of one sprocket wheel, will ride over the teeth of the sprockets, the movement of the sprocket 4 permitting the perforations of the second film section to engage the teeth of the sprocket 1 before the end of the first section leaves the sprocket 4.

Having thus described my invention, what I claim as new and desire to obtain by Letters Patent, is:—

1. The combination of a sprocket rotating in fixed bearings, of a second sprocket independent of the first sprocket and movable slightly toward and from the first sprocket, means for transmitting motion from the first to the second sprocket, and means for imparting motion to the first mentioned sprocket.

2. The combination of a sprocket rotating in fixed bearings, of a second sprocket independent of the first sprocket and movable slightly toward and from the first sprocket, means for transmitting motion from the first to the second sprocket, and a roller over which the film passes after leaving the second sprocket.

3. The combination of a sprocket rotating in fixed bearings, of a second sprocket mounted adjacent and parallel to said first sprocket said second sprocket being spaced from said first sprocket a distance sufficient to permit a film to pass between the sprockets clear of the teeth of both sprockets, said second sprocket being shiftable to a slight extent, to vary the distance between the points of contact of their common tangents, and means for positively driving both said sprockets.

4. The combination with a sprocket rotating in fixed bearings, of a second sprocket movable slightly toward and from the first sprocket, means for transmitting motion to the first sprocket, a pair of gear wheels connected to said sprockets and intermeshing and a film guide roller mounted in the rear of the movable sprocket with its axis in substantially the same plane as the axes of said sprockets.

In testimony whereof, I have signed my name.

NICHOLAS POWER.

Witnesses:
 LAWRENCE W. ATWATER,
 BAXTER MORTON,
 JACOB ORNSTEIN.